United States Patent
Timus

(10) Patent No.: US 9,344,946 B2
(45) Date of Patent: May 17, 2016

(54) METHODS AND ARRANGEMENTS IN A NETWORK NODE

(75) Inventor: Bogdan Timus, Spånga (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 225 days.

(21) Appl. No.: 14/115,656

(22) PCT Filed: May 6, 2011

(86) PCT No.: PCT/SE2011/050569
§ 371 (c)(1),
(2), (4) Date: Nov. 5, 2013

(87) PCT Pub. No.: WO2012/154088
PCT Pub. Date: Nov. 15, 2012

(65) Prior Publication Data
US 2014/0064158 A1    Mar. 6, 2014

(51) Int. Cl.
H04W 36/30    (2009.01)
H04W 36/26    (2009.01)
H04W 84/04    (2009.01)

(52) U.S. Cl.
CPC .............. *H04W 36/30* (2013.01); *H04W 36/26* (2013.01); *H04W 84/047* (2013.01)

(58) Field of Classification Search
CPC ............................. H04W 36/30; H04W 36/26
USPC ........................................................ 370/279
See application file for complete search history.

(56) References Cited

U.S. PATENT DOCUMENTS 8,849,271 B2    9/2014    Moberg et al.
8,861,427 B2    10/2014   Naslund et al.
2009/0046665 A1*    2/2009    Robson et al. ............... 370/332
2011/0249558 A1*    10/2011   Raaf et al. .................... 370/237
2013/0070742 A1*    3/2013    Picker et al. .................. 370/338

FOREIGN PATENT DOCUMENTS

| EP | 2 091 278 A1 | 8/2009 |
|---|---|---|
| EP | 2306774 A1 | 4/2011 |
| GB | 2452794 A | 3/2009 |
| WO | WO 2010/130268 | * 11/2010 |
| WO | WO 2010/130268 A1 | 11/2010 |
| WO | WO 2011/099919 A1 | 1/2011 |

(Continued)

OTHER PUBLICATIONS

Timus. Deployment Cost Efficiency in Broadband delivery with fixed wireless relays. Licentiate thesis. KTH, School of Information and Communication Technology. Stockholm. 2006.
Zhang, et al. A Novel Handover Mechanism Between Femtocell and Macrocell for LTE Based Networks. Communication Software and Networks. Second International Conference on,. Feb. 2010.

(Continued)

*Primary Examiner* — Ian N Moore
*Assistant Examiner* — Mewale Ambaye

(57) ABSTRACT

A method and arrangement in a first network node, which is serving a user equipment, for determining whether a handover of the user equipment is to be made to a second network node. The first network node and the second network node are configured for wireless communication with each other over a backhaul link in half-duplex communication mode. The first network node obtains an estimation of data-rate performance over the backhaul link, and determines whether to hand over the user equipment to the second network node based on the obtained estimation of the data-rate performance over the backhaul link.

21 Claims, 7 Drawing Sheets

(56) References Cited

FOREIGN PATENT DOCUMENTS

| WO | WO 2011/050840 A1 | 5/2011 |
| WO | WO 2011/066853 A1 | 6/2011 |
| WO | WO 2011/068237 A1 | 6/2011 |
| WO | WO 2012/002854 A1 | 1/2012 |

OTHER PUBLICATIONS

Timus, Bogdan; "Deployment Cost Efficiency in Broadband Delivery with Fixed Wireless Relays," KTH Information and Communication Technology, Licentiate Thesis in Telecommunications, Stockholm, Sweden; 2006.

* cited by examiner

METHODS AND ARRANGEMENTS IN A NETWORK NODE

TECHNICAL FIELD

Implementations described herein relate generally to a method and an arrangement in a first network node. In particular is herein described how to determine if a user equipment, served by the first network node, is to be a handed over to a second network node.

BACKGROUND

User equipment (UE), also known as mobile stations, wireless terminals and/or mobile terminals are enabled to communicate wirelessly in a wireless communication system, sometimes also referred to as a cellular radio system. The communication may be made e.g. between two user equipment units, between a user equipment and a regular telephone and/or between a user equipment and a server via a Radio Access Network (RAN) and possibly one or more core networks.

The user equipment units may further be referred to as mobile telephones, cellular telephones, laptops with wireless capability. The user equipment units in the present context may be, for example, portable, pocket-storable, hand-held, computer-comprised, or vehicle-mounted mobile devices, enabled to communicate voice and/or data, via the radio access network, with another entity, such as another user equipment or a server.

The wireless communication system covers a geographical area which is divided into cell areas, with each cell area being served by a network node, or base station e.g. a Radio Base Station (RBS), which in some networks may be referred to as "eNB", "eNodeB", "NodeB" or "B node", depending on the technology and terminology used. The network nodes may be of different classes such as e.g. macro eNodeB, home eNodeB or pico base station, based on transmission power and thereby also cell size. A cell is the geographical area where radio coverage is provided by the network node/base station at a base station site. One base station, situated on the base station site, may serve one or several cells. The network nodes communicate over the air interface operating on radio frequencies with the user equipment units within range of the respective network node.

In some radio access networks, several network nodes may be connected, e.g. by landlines or microwave, to a Radio Network Controller (RNC) e.g. in Universal Mobile Telecommunications System (UMTS). The RNC, also sometimes termed a Base Station Controller (BSC) e.g. in GSM, may supervise and coordinate various activities of the plural network nodes connected thereto. GSM is an abbreviation for Global System for Mobile Communications (originally: Groupe Special Mobile).

In 3rd Generation Partnership Project (3GPP) Long Term Evolution (LTE), network nodes, or base stations, which may be referred to as eNodeBs or even eNBs, may be connected to a gateway e.g. a radio access gateway. The radio network controllers may be connected to one or more core networks.

UMTS is a third generation mobile communication system, which evolved from the GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for user equipment units. The 3 GPP has undertaken to evolve further the UTRAN and GSM based radio access network technologies.

The 3GPP is responsible for the standardization of UMTS and LTE. LTE is a technology for realizing high-speed packet-based communication that may reach high data rates both in the downlink and in the uplink, and is thought of as a next generation mobile communication system relative UMTS.

In the present context, the expressions downlink, downstream link or forward link may be used for the transmission path from the network node to the user equipment. The expression uplink, upstream link or reverse link may be used for the transmission path in the opposite direction i.e. from the user equipment to the network node.

The basic principle used in cellular wireless communication systems (GSM, UMTS, LTE) comprises the following steps:
(a) each network node sends a pilot signal,
(b) the user equipment measures the received pilot signal strength from the serving network node and from several neighbouring network nodes,
(c) the user equipment reports back to the serving network node the result of the measurements, and
(d) the serving network node decides whether the user equipment should be handed over to another cell or not.

Typically, the user equipment is instructed to connect to the network node with the highest received pilot power, which defines the reference cell size.

In order to reduce the amount of measurement reports sent to the user equipment to the network node, the user equipment is instructed to perform comparisons between the received pilot signal from the serving network node and from the neighbouring cells, and to report the measurements only if some predefined criterion is fulfilled. For instance, the user equipment may report measurements only if the signal from a neighbouring cell is 3 dB larger than the signal from the serving cell. Besides such thresholds, the criterion may also comprise timers, etc. for avoid toggling between cells.

The decision to handover the user equipment is nonetheless taken by the serving network node. Hence, even if the power from a neighbouring cell exceeds by far the power received from the serving cell, the serving network node may still decide not to handover the user equipment for other reasons such as e.g. load balancing.

All systems, like GSM, UMTS or LTE implement this type of mechanism.

The aforementioned procedure of selecting the cell with the strongest pilot signal is typically the best selection for the downlink, because high received pilot power typically corresponds to high SNR on the downlink. In LTE, the procedure is referred to a Reference Signal Received Power (RSRP) based cell selection.

If the transmitted pilot power is the same for all the network nodes, then equal received RSRP from two network nodes corresponds to equal pathloss to these two network nodes. In this case, the RSRP-based cell selection is optimal also on the uplink. However, if there is a difference between the pilot power sent by two network nodes, then the RSRP from the high-power network node may be stronger than the RSRP from the low-power network node, although the user equipment is closer to the low-power network node from a radio and geographic point of view, as the case may be in heterogeneous networks. The coverage of the low-power network node may be significantly smaller than the coverage of the high power network node.

It is well known that in such networks, also called Heterogeneous networks (HetNet), the RSRP cell selection is suboptimal for the uplink. A known solution to this problem is to extend the coverage of the low-power network node by adding an offset to the RSRP measured from the low-power network node. The larger the cell selection offset, the larger the coverage of the low-power network node. If the pilot power difference between two network nodes is δ and the cell selection offset is set to δ, then basically the cell selection is based on the pathgain (coupling loss), which would be optimal for uplink. Thus the cell selection offset is configured to be between 0 and δ, so as to trade-off between the downlink and the uplink performances.

The standard for LTE-Advanced comprises relaying techniques which allow a network node to connect to another network node using the same radio interface and spectrum as for the connections with the user equipments. This allows the network node to connect to another network node within the wireless communication network when there is no alternative backhaul transport solution.

FIG. 1A presents a scenario in a heterogeneous network comprising a base station and a relay node. The base station and the relay node are connected via a wireless backhaul link. Also a user equipment is situated somewhere in between the base station and the relay node and may potentially be served by one of these nodes.

Assume that the user equipment in FIG. 1A receives a stronger RSRP from the relay node than from the base station. According to the standard procedure, the user equipment will get connected to the relay node. As previously discussed, the coverage of the relay node may be extended by using a positive cell selection offset δ.

Towards the base station, the relay node acts as a user equipment. Towards the user equipment, the relay node acts as a base station. The user equipment may not make any logical distinction between a cell created by a relay node and the cell created by a regular base station. In fact the user equipment may not even be aware of the existence of the radio backhaul connection.

Another relevant aspect of relaying networks is the spectrum resources used for the backhaul. One distinguishes between out-of-band and in-band relaying. In the former case, the backhaul link uses a different frequency carrier and even a different access technology than the access link uses. In this case, when using out-of-band relaying, the interference between the two links may be negligible and the two links may be managed independent on each other. In the later case, the backhaul and the access link use the same carrier and therefore may interfere with each other.

A typical limitation of in-band relays is that are not be able to send and receive on the same channel, at the same time, i.e., they use a half-duplex communication mode. In order to send and receive on the same channel, the relay node would need two antenna system (one for communicating with the donor base station, and one for communicating with the user equipments), and the isolation between the two antenna systems needs to be very high. This would increase the cost and the dimensions of the relay node, which for most of practical deployment cases would make the relay node unfeasible. Therefore in-band-relaying typically leads to increased interference and increased data-buffer lengths, causing increased delays within the network.

While cell extension through a handover offset is a possible solution to mitigate the interference problem in heterogeneous networks, and alternative solution may be for the (donor) base station to schedule those user equipment which are located close to the relay node on the same type of resources as the backhaul link. By doing so, the user equipment will not be active at the same time as the access links connected to the relay node, and therefore the user equipment and the relay node will not cause interference to each other.

As the subsequent disclosure exclusively relates to half-duplex in-band relay nodes, the term in-band is omitted in the subsequent text. By "relaying" it is herein meant "in-band relaying", unless otherwise stated.

A common problem when relaying in half-duplex is that effective data-rate performance for some user equipment may actually be degraded when using relay nodes.

Assume that the communication between source and destination may use only one resource element, for instance a time slot. The communication may be either direct over the radio link denoted Gd in FIG. 1A i.e., the user equipment selects the base station cell, or through a relay node i.e., the user equipment selects the relay cell.

FIG. 1B shows the resource allocation in a prior art relaying network. On the Y axis, the resources indicated between time slot index 0 and n are used by the relay node only for the backhaul communication. The resources n+1 to 10 are utilized for the signalling to/from user equipment. Thus interference between the backhaul and the signalling made via the relay node to/from user equipment within the cell of the relay node is avoided. On the X-axis is, in a schematic way, the distances between the base station and the relay node, in a radio sense, and also the estimated cell limit between the respective cells indicated.

The resources 0 to n may also be used by for the communication between the base station and the user equipment connected to the base station. However, the base station is using a time slot (or a radio resource in general) to communicate either with the relay, or with a user equipment, but not with both at the same time.

However, the limitation of half duplex transmission over the backhaul link also leads to a situation where the end-to-end data rate performance decrease when transmitting via the relay node, in comparison to direct transmission from the base station, as the resources have to be shared between the backhaul link and the link between the relay node and the user equipment. There will also be a delay in the relay node when shifting from receiving signals from the base station over the backhaul link and transmitting signals to the user equipment within the own cell, leading to a degradation of performance within the wireless communication system.

Thus, it would in many cases be an advantage from this point of view, to let user equipment connect directly to the base station, even if they are situated close to the relay node. However, if that is done, interference would be generated between the user equipment and the relay node for user equipment situated close to the relay node.

More exactly, the relay node would generate huge downlink interference to the user equipment, while the user equipment would generate huge uplink interference to the relay node, which would render such cell selection method impossible to use.

In a low-cost deployment of relay nodes, it is likely for some user equipment to be located close to the relay node, although they have good direct link to the base station. Previous studies have shown that this leads to severe degradation of the network performance, in the sense that many user equipment units that expected to have high data rates by connecting directly to the base station, instead experience poor data-rates when the relay nodes are added.

If this problem is not solved, it is likely for the operators and end-users to be very unhappy with the introduction of relay nodes.

SUMMARY

It is therefore an object to obviate at least some of the above mentioned disadvantages and to improve the performance in a wireless communication system.

According to a first aspect, the object is achieved by a method in a first network node, which is serving a user equipment. The method aims at determining if a handover of the user equipment is to be made to a second network node. The first network node and the second network node are configured for wireless communication with each other over a backhaul link in half-duplex communication mode. The method comprises obtaining an estimation of data-rate performance over the backhaul link. Also, the method comprises determining to handover the user equipment to the second network node, based on the obtained estimation of the data-rate performance over the backhaul link.

According to a second aspect, the object is achieved by an arrangement in a first network node, which is serving a user equipment. The arrangement aims at determining if a handover of the user equipment is to be made to a second network node. The first network node and the second network node are configured for wireless communication over a backhaul link in half-duplex communication mode. The arrangement comprises a processing circuit. The processing circuit is configured to obtain an estimation of data-rate performance over the backhaul link. Further, the processing circuit is configured to determine if handover of the user equipment is to be made to the second network node, based on the obtained estimation of the data-rate performance over the backhaul link.

Thanks to embodiments of the present methods and arrangements, by letting the decision to handover the user equipment from the base station to relay node be based on the end-to-end data rate, rather than signal strength measurements made by the user equipment, less user equipment may be handed over to the relay node if the backhaul link is suffering from high interference. Thereby may more user equipment take advantage of being served by the base station, thereby achieving a better throughput of data than would have been the case if handed over to the relay node.

Further, by scheduling user equipment which are in particular exposed for interference, due to their position close to the relay node, such that they are not scheduled with the same resources as are used for the backhaul link, interference is reduced. Such selection of user equipment which is in particular exposed for interference may jointly be based on end-to-end bit-rate estimates and on information about the scheduler. Thus is an improved performance within the wireless communication system is achieved.

Additionally, embodiments of the methods and arrangements may separately and independently be implemented in the base station and the relay node according to some embodiments.

Other objects, advantages and novel features will become apparent from the following detailed description of the present method and user equipment.

BRIEF DESCRIPTION OF THE DRAWINGS

The methods and arrangements are described in more detail with reference to attached drawings illustrating examples of embodiments in which.

DETAILED DESCRIPTION

Embodiments herein are defined as a method and an arrangement in a first network node, which may be put into practice in the embodiments described below. These embodiments may, however, be exemplified and realised in many different forms and are not to be considered as limited to the embodiments set forth herein; rather, these embodiments are provided so that this disclosure will be thorough and complete.

Still other objects and features may become apparent from the following detailed description considered in conjunction with the accompanying drawings. It is to be understood, however, that the drawings are designed solely for purposes of illustration and not as a definition of the limits of the herein disclosed embodiments, for which reference is to be made to the appended claims. It is further to be understood that the drawings are not necessarily drawn to scale and that, unless otherwise indicated, they are merely intended to conceptually illustrate the structures and procedures described herein.

Figure 1A:
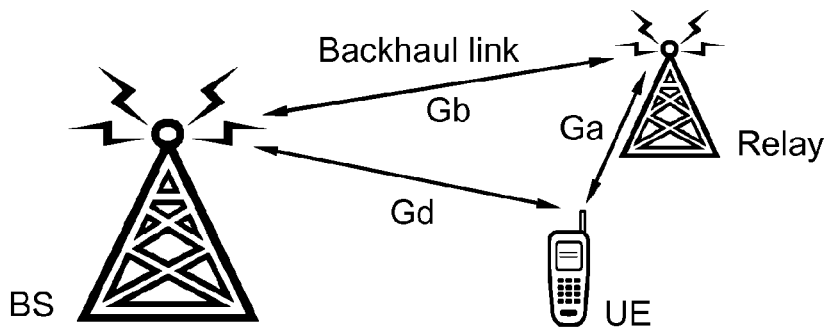
FIG. 1A is a schematic block diagram illustrating a wireless communication system according to prior art.
Figure 1B:
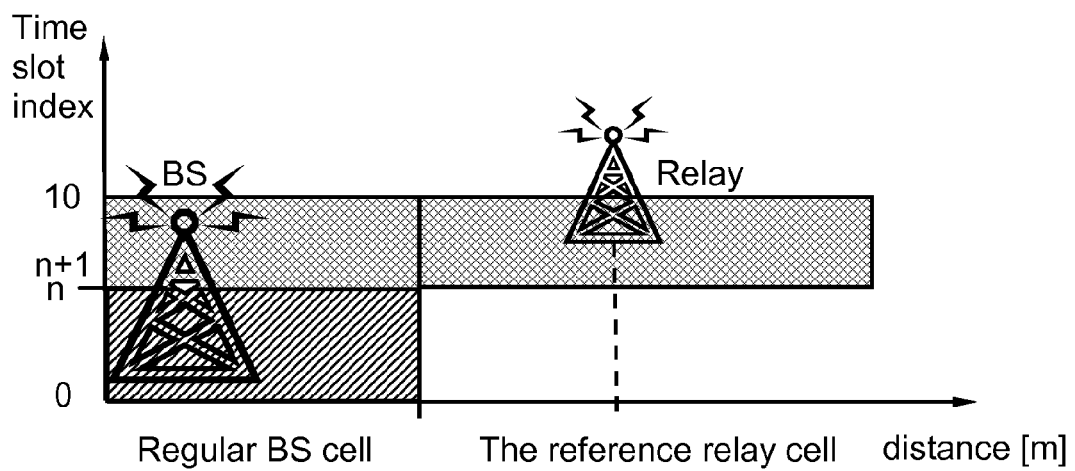
FIG. 1B is a schematic block diagram illustrating scheduling in a wireless communication system according to prior art.
Figure 2:
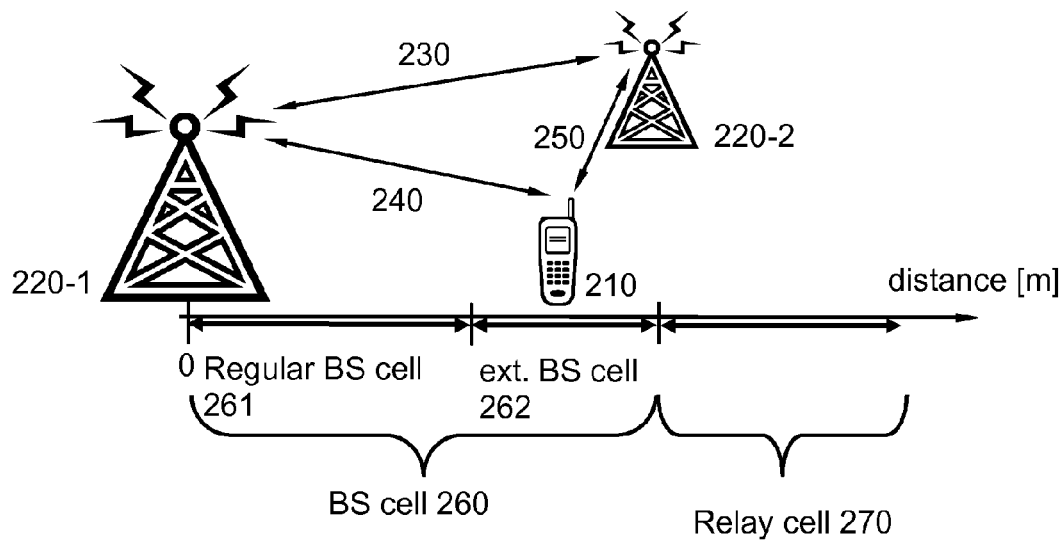
FIG. 2 is a schematic block diagram illustrating an example of a wireless communication system according to some embodiments.

FIG. 2 depicts a wireless communication system 200. The wireless communication system 200 may at least partly be based on radio access technologies such as e.g. 3GPP LTE, LTE-Advanced, Evolved Universal Terrestrial Radio Access Network (E-UTRAN), UMTS, GSM/Enhanced Data rate for GSM Evolution (GSM/EDGE), Wideband Code Division Multiple Access (WCDMA), Worldwide Interoperability for Microwave Access (WiMax), or Ultra Mobile Broadband (UMB), High Speed Packet Access (HSPA) Evolved Universal Terrestrial Radio Access (E-UTRA), Universal Terrestrial Radio Access (UTRA), GSM EDGE Radio Access Network (GERAN), 3GPP2 CDMA technologies e.g. CDMA2000 1×RTT and High Rate Packet Data (HRPD), just to mention some few options.

The wireless communication system 200 may be configured to operate according to the Time Division Duplex (TDD) and/or the Frequency Division Duplex (FDD) principle, according to different embodiments.

TDD is an application of time-division multiplexing to separate uplink and downlink signals in time, possibly with a guard period situated in the time domain between the uplink and downlink signalling. FDD means that the transmitter and receiver operate at different carrier frequencies.

The purpose of the illustration in FIG. 2 is to provide a simplified, general overview of the methods and arrangements herein described, and the functionalities involved. The methods and arrangements will subsequently, as a non-limiting example, be described in a 3GPP/LTE environment, but the embodiments of the disclosed methods and arrangements may operate in a wireless communication system 200 based on another access technology.

The wireless communication system 200 comprises at least one first network node 220-1, at least one second network node 220-2 and at least one user equipment 210, arranged to communicate with each other. The first network node 220-1 may communicate with the second network node 220-2 over a backhaul link 230. The first network node 220-1 may communicate with the user equipment 210 over a first link 240, and the second network node 220-2 may communicate with the user equipment 210 over a second link 250. The user equipment 210 is situated in a first cell 260, defined by the first network node 220-1. However, the user equipment 210 may move and enter a second cell 270, defined by the second network node 220-2. The user equipment 210 is configured to transmit radio signals comprising information to be received by the first network node 220-1. Contrariwise, the user equipment 210 is configured to receive radio signals comprising information transmitted by the first network node 220-1. The communication between the first network node 220-1 and the user equipment 210 is thus made over a first link 240.

It is to be noted that the illustrated network setting of network nodes 220-1, 220-2 and user equipment 210 in FIG. 2 is to be regarded as a non-limiting embodiment only. The wireless communication network 200 may comprise any other number and/or combination of network nodes 220-1, 220-2 and or user equipment units 210, although only one instance of a user equipment 210 and two instances of network nodes 220-1, 220-2, respectively, are illustrated in FIG. 2 for clarity reasons. A plurality of network nodes 220-1, 220-2 and/or user equipment units 210 may further be involved in the present methods according to some embodiments.

Thus whenever "one" or "a/an" network node 220-1, 220-2 and/or user equipment 210 is referred to in the present context, a plurality of network nodes 220-1, 220-2 and/or user equipment units 210 may be involved, according to some embodiments.

The first network node 220-1 may according to some embodiments be referred to as e.g. base station, NodeB, evolved Node B (eNB, or eNode B), base transceiver station, Access Point Base Station, base station router, Radio Base Station (RBS), macro base station, micro base station, pico base station, femto base station, Home eNodeB, sensor, beacon device or any other network node configured for communication with the user equipment 210 over a wireless interface, depending e.g. of the radio access technology and terminology used.

The second network node 220-2 may according to some embodiments be referred to as e.g. a relay node and/or a repeater, and be configured for communication with the user equipment 210 over a wireless interface.

However, the situation may further according to some embodiments be the opposite, as will later be described in more detail, such that the first network node 220-1 may be referred to as e.g. a relay node and/or a repeater. Further, according to such embodiments, the second network node 220-2 may be referred to as e.g. base station, NodeB, evolved Node B (eNB, or eNode B), base transceiver station, Access Point Base Station, base station router, Radio Base Station (RBS), macro base station, micro base station, pico base station, femto base station, Home eNodeB, sensor, beacon device or any other network node configured for communication with the user equipment 210 over a wireless interface, depending e.g. of the radio access technology and terminology used.

In the illustrated scenario in FIG. 2, the first network node 220-1 comprises a donor base station in relation to the second network node 220-2, which thus comprises a relay node. However, according to some embodiments may the situation be the reversed, as will later be described in more detail, such that the second network node 220-2 may comprise a donor base station in relation to the first network node 220-1, which may comprise a relay node.

In the subsequent part of the disclosure, in order to not unnecessarily complicate the explanation, the methods and arrangements in the scenario depicted in FIG. 2 will be described, wherein the term "first network node", or "base station", or even "donor base station" will be used for the first network node 220-1, while the term "second network node" or "relay node" will be used for the second network node 220-2, in order to facilitate the comprehension of the present methods; however, without forgetting that the donor/relay relationship between the network nodes 220-1, 220-2 may be the reversed according to some alternative embodiments.

The user equipment 210 may be represented by e.g. a wireless communication terminal, a mobile cellular phone, a Personal Digital Assistant (PDA), a wireless platform, a mobile station, a portable communication device, a laptop, a computer, a wireless terminal acting as a relay, a relay node, a mobile relay, a Customer Premises Equipment (CPE), a Fixed Wireless Access (FWA) nodes or any other kind of device configured to communicate wirelessly with the first or second network node 220-1, 220-2.

The first network node 220-1 controls the radio resource management within the first cell 260, such as e.g. allocating radio resources to the user equipment units 210 within the first cell 260 and ensuring reliable wireless communication link 240 between the first network node 220-1 and the user equipment 210. The first network node 220-1 may comprise an eNodeB, e.g. in an LTE-related wireless communication system 200.

Embodiments of the herein disclosed method comprises two components: firstly to base the cell selection of each user equipment 210 on information about three links (UE-to-donor BS 240, UE-to-relay 250, and backhaul 230), and secondly to jointly perform the cell selection and the resource allocation.

The embodiments described in the following explain that how information about the three links 230, 240, 250 may be collected using the currently standardised protocols and how the first and/or second network nodes 220-1, 220-2, i.e. donor base station 220-1 and/or the relay node 220-2, may take cell selection, i.e. handover, decisions. The procedures are slightly different for the donor base station 220-1 and the relay node 220-2. The goal is to avoid routing through the relay node 220-2, those user equipments 210 which have higher data-rate when connected directly to the donor base station 220-1, even if they are located close to the relay node 220-2. Compared to a cellular heterogeneous network, this essentially means that the border between the relay cell 270 and the donor cell 260 is moved closer to the relay node 220-2, or even beyond the relay node 220-2, as illustrated in FIG. 2.

In a heterogeneous network according to the prior art, the performance is instead improved by moving the cell border way from the low power base station 220-2, i.e., in the opposite direction than according to the herein described method.

However, for avoiding interference between the user equipment 210 and the relay node 220-2 the cell selection is done jointly with a resource allocation technique according to some embodiments.

Hence, if the donor base station does not apply such a interference avoidance technique, embodiments of the method of cell selection may degrade the over all network performance.

With the prior art cell selection techniques, for instance based on RSRP, the donor cell only covers the regular base station cell area 261. However according to the present method, the donor cell 260 is extended with the extended base station area 262, so that the donor cell 260 comprises both the regular base station cell area 261 and in addition the extended base station area 262.

The size of the new base station cell 260, particularly the border between the new base station cell 260 and the relay cell 270, depends on how good the backhaul link 230 is with respect to how good the access links to the base station 220-1 and relay node 220-2, respectively, are. If there are user equipment 210 located close to the relay but with almost as good direct link to the base station 220-1 as the backhaul link 230, then the border between the new base station cell 260 and the relay cell 270 may be located beyond the relay node 220-2, further to the right as in FIG. 2. If, instead, the backhaul link 230 is much better than any of the access links 240, 250, then the border between the new base station cell 260 and the relay cell 270 may move further to the left. At the extreme, the donor cell extension 262 disappears and relay cell 270 becomes as large as the cell in a regular HetNet.

Figure 3:
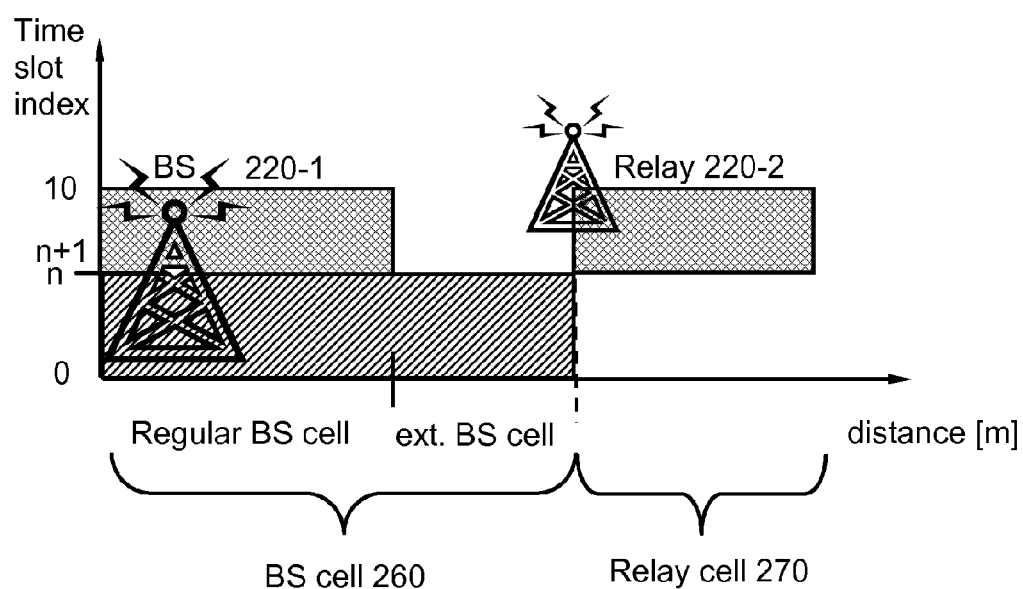
FIG. 3 is a schematic block diagram illustrating an example of an embodiment of scheduling in a wireless communication system according to some embodiments.

The effect of this joint operation is illustrated in FIG. 3: the coverage of the donor base station cell 260 is extended, but the user equipment 210 in the extended zone 262 are scheduled on different resources time slot index 0-n, than the resources used for the user equipment 210 in the relay cell 270, scheduled on resources time slot index (n+1)-10.

According to embodiments of this approach illustrated in FIG. 3, may two operations be jointly performed: firstly, to let the serving node to include the performance of the backhaul link 230 into the cell selection for each individual user equipment 210, and secondly to avoid interference between the user equipment 210 connected to the base station 220-1 and the user equipment 210 connected to the relay node 220-2. The embodiments refer to (a) the method used by the base station 220-1 to determine the handover threshold for each individual user equipment 210, (b) the method used by the relay node 220-2 to determine the handover threshold for each individual user equipment 210, and (c) method for the base station 220-1 and the relay node 220-2 to find out whether also the other node is jointly configured for using the herein described techniques.

Embodiments of the herein described methods and arrangements may further enhance the overall network performance, for instance by reducing the number of measurement reports from the user equipment 210, or by allowing the technique proposed herein to be applied to the handover between a relay node 220-2 and another base station, which is not the donor base station 220-1 of the relay node 220-2.

The subsequently described explanations and embodiments are exemplified in an FDD LTE environment, as a non-limiting example. The embodiments may separately describe the downstream (i.e. from the base station 220-1 towards the user equipment 210) and the upstream (i.e. from the user equipment 210 towards the base station 220-1). However the methods and arrangements may easily be generalized and applied to e.g. a TDD LTE system, and also to cellular systems other than based on the LTE standard, or in fact any other cell based access technology where in-band relaying may be applied.

The extended base station cell 262 does not have a distinct cell identify from the regular base station cell 261, i.e. they are together forming the base station cell 260. The term extended base station cell 262 is herein utilised, and also illustrated in the FIGS. 2 and 3, to clarify the difference of the base station cell 260 according to the present methods and the regular base station cell 261, as it would had remain using prior art methods. From the perspective of the user equipment 210, the extended base station cell 262 is only an extension of the regular base station cell 261. Therefore no special handling of cell identities may be needed. Moreover, no changes or additions to the current LTE standards may be needed according to some embodiments.

The concept of the extended base station cell 262 may be implemented in the donor base station 220-1, and may represent a clustering of the user equipment units 210, depending on the radio positions with respect to the donor base station 220-1 and the relay node 220-2, respectively. The clustering may be used for resource allocation, more exactly for interference avoidance according to some embodiments, which are subsequently described.

Further, embodiments of the methods and arrangements may improve the user-plane performance of the wireless communication system 100. The cell selection for the idle user equipment 210 may not be as critical as for user equipment 210 in active mode, i.e. user equipment 210 having Radio Resource Control (RRC) connections. Thus embodiments of the methods herein described may apply in particular to user equipment 210 in active mode.

The process of cell selection will now be explained by describing the handover procedures, which is implemented in the serving network node 220-1, 220-2 and follows the three actions of:

1. measurement acquisition (from the user equipment 210) and processing of the acquired measurements;
2. handover criteria evaluation for each user equipment 210; and
3. execution of the handover to another network node of those user equipment 210 for which the handover criterion is fulfilled.

The herein disclosed embodiments are focused on improving the first two actions above, while the execution of the handover is considered to be outside of the scope of the disclosed embodiments.

According to the current 3GPP standard for LTE, the base station 220-1 (eNB) transmits a Reference Signal (RS) with constant power. The transmitted reference signal has the same Energy Per Resource Element across the entire band used in the cell 260. The Radio Resource Control (RRC) protocol describes an information element called Physical Downlink Shared Channel Config. (PDSCH-Config) by which the serving network node 220-1 informs the user equipment 210 about the power level of the transmitted reference signal, called "referenceSignalPower". The user equipment 210 may use this information together with the measured Reference Signal Received Power (RSRP) to estimate the pathgain between the serving network node 220-1 and the user equipment 210. This measurement is then used by the user equipment 210 to control the uplink power. Since the user equipment 210 reports RSPR measurements to the serving network node 220-1, upon request from the network node 220-1, then the serving network node 220-1 may have enough information to estimate the pathgain between itself and the reporting user equipment 210.

The same procedure may apply when the user equipment 210 is connected to the relay node 220-2.

An example will now be described, in which the user equipment 210 is handed over from the relay node 220-2 to the base station 220-1. Thus, in this example, the user equipment 210 is served by the relay node 220-2, and thereby it is the relay node 220-2 that has to decide whether to handover the user equipment 210 to the base station 220-1, or not. Embodiments of the entire procedure may be applied to any user equipment 210 connected to the relay node 220-2.

The idea is for the relay node 220-2 to gather information about all three links 230, 240, 250 shown in FIG. 2, thereby acquiring measurements with the purpose of estimating whether the direct connection between the base station 220-1 and the user equipment 210 would lead to higher data-rate per resource element than the currently used connection between the base station 220-1, via the relay node 220-2 to the user equipment 210. In an illustrated embodiment, this information is based on estimating the three pathgain values denoted Ga, Gb and Gd, where Gd is the estimated pathgain over the link 240 between the base station 220-1 and the user equipment, Gb is the estimated pathgain over the backhaul link 230 and Ga is the estimated pathgain over the access link 250 between the relay node 220-2 and the user equipment 210.

The pathgain Ga in the access link 250 between the relay node 220-2 and the user equipment 210 is estimated by the relay node 220-2 based on RSRP reports from the user equipment 210, as previously discussed. This estimation may be triggered by a measurement report sent by the user equipment 210.

The pathgain Gb in the backhaul link 230 between the base station 220-1 and the relay node 220-2 is estimated by the relay node 220-2 during the attachment phase, i.e., when the relay node 220-2 behaves as a user equipment against the donor base station 220-1 and follows the pathgain estimation procedure. If the relay node 220-2 is stationary, the pathgain is likely to remain unchanged over a very long period of time, such as e.g. months or more. Thus, according to those embodiments, the pathgain Gb may be estimated to be constant over a certain period of time. However, the relay node 220-2 may according to some embodiments be movable, such as e.g. mounted on a vehicle such as a bus or a train. As the signal propagations in such case is likely to change more frequently over time, the pathgain Gb in the backhaul link 230 may be measured and updated more frequently.

The relay node 220-2 may execute the pathgain estimation procedure even after quitting the above described attachment phase. Optionally, the relay node 220-2 may refresh the information about the transmitted power level for the reference signals by forcing the base station 220-1 to send an updated information element PDSCH-Config. This may be done for instance by resetting the RRC connection during low traffic hours.

The novel procedure used by the relay node 220-2 to estimate the pathgain Gd in the direct access link 240 between the base station 220-1 and the user equipment 210 may comprise: instructing the user equipment 210 to measure and report the RSRP from the base station 220-1, using the referenceSignalPower from the PDSCH-Config information element received by the relay node 220-2 directly from the base station 220-1, and by subtracting the RSRP value reported by the user equipment 210 from the referenceSignalPower. This measurement may be done on the cell-specific reference signals, i.e., on signals which are not specific for the user equipment 210.

The next action may be to estimate the data-rates per resource element in the three links 230, 240, 250, and then the estimated equivalent bit-rates per resource element of transmissions made between the base station 220-1 and the user equipment 210. In some embodiments may an analytic expression be utilized to map the estimated pathgain to the estimated bit-rate:

$$\overline{BR}=f(G)=\min\{\log_2(1+G\cdot\gamma),BR\max\}$$

where $\gamma$ is a suitably selected parameter reflecting the link quality, such as e.g. SNR. For instance:

$$\gamma=(2^{BRa}-1)/Ga$$

Where BRa is the bit-rate in the access link 250 between the relay node 220-2 and the user equipment 210. For the purpose of estimating the bit-rate per resource element in a link 230, 240, 250, any other analytic expression or a look-up table of the subsequent form may be used:

$$\overline{BR}=f(G)$$

Such look-up table may be preloaded at installation according to some embodiments. Further, the look-up table may also be updated by an Operation and Maintenance centre through a protocol according to some embodiments. In addition, such look-up table may also be updated based on information from the donor base station 220-1 through a protocol. Also, in addition, the look-up table according to some embodiments may furthermore be adaptively updated based on pathgain and bit-rate observations on the link 250 between the user equipment 210 and the relay node 220-2. The adaptive updating of the look-up table may be further improved, based on information about the base station antenna configuration, the base station antenna receiver, and the user equipment characteristics.

The current bit-rates on the backhaul link 230, BRb, and on the access link 250 between the relay node 220-2 and the user equipment 210, BRa, respectively, may be used instead of estimating them based on the pathgains Gb, Ga.

The preferred embodiment is to estimate the equivalent end-to-end bit-rate between the base station 220-1 and the user equipment 210 through the current connection by:

$$\overline{BRm} = \frac{BRa \cdot BRb}{BRa + BRb}$$

According to an alternative embodiment may the relay node 220-2 actually monitor the gross bit-rate delivered to the user equipment 210, to estimate the amount of resource elements used for serving the user equipment 210, both in the access link 250 and in the backhaul link 230, and to compute the bit-rate per resource element by dividing the two values. However, any other estimation of the end-to-end equivalent bit-rate may be utilised instead, according to some embodiments. The potential bit-rate per resource element in the direct link 240 between the base station 220-1 and the user equipment 210 may be estimated. For the uplink, an approach according to some embodiments may be to utilise:

$$\overline{BRd}=f(Gd)$$

For the downlink, the approach according to some embodiments may be to use:

$$\overline{BRd} = f\left(Gd \frac{Pbs}{Prm}\right)$$

Where Pbs is the reference signal power broadcasted by the base station 220-1 in the PDSCH-Config information element, and Prn may be the reference signal power used by the relay node 220-2. Other estimation methods may alternatively be used as well according to some embodiments, for instance to account for differences in the receiver sensitivity on the uplink.

The measurement processing actions described above may be seen as part of the handover decision process. Once the data-rates are estimated for the two paths 240 and 230+250 respectively, i.e. from the donor base station 220-1 to the user equipment 210 directly, or from the donor base station 220-1, over the backhaul link 230 via the relay node 220-2, to the user equipment 210. The relay node 220-2 may according to some embodiments initiate the procedure of handing over the user equipment 210 to the base station 220-1, if the following condition is fulfilled:

$$\overline{BRd} > \overline{BRrn}$$

The handover decision may be taken based on the uplink estimates or on the downlink estimates, depending on which performance measurement that is regarded as more critical in the particular application, according to some embodiments. Combinations of the uplink and downlink measures may be used as well according to some embodiments. Essentially this means that the handover decision may be based on the aforementioned bit-rate estimates, instead of the RSRP measures. Hence techniques may be applied on the handover decisions on RSRP to reduce ping-pong effects, such as the use of hysteresis thresholds and/or hysteresis timers, may be applied according to some embodiments.

In order to enforce the aforementioned procedure, the user equipment 210 must report the RSRP for the pilot signal transmitted by the base station 220-1, even when the RSRP from the relay node 220-2 is much stronger. A straightforward solution may be to configure the user equipment 210 so as to periodically report RSRP measurements from the donor base station 220-1, regardless the RSRP level of pilot signal transmitted by the relay node 220-2.

In order to reduce the number of measurement reports sent by the user equipment 210, the relay node 220-2 may compute a handover threshold as described next, and then use it to configure the measurement reporting procedure in the user equipment 210.

Given the measured or estimated bit-rate $\overline{BRrn}$, the relay node 220-2 may apply the inverse transform (or, alternatively, reverse look-up table) and find the direct pathgain for which the bit-rate in the direct path is the same as the bit-rate on the (currently used) relay path:

$$\overline{Gd} = f^{-1}(\overline{BRrn})$$

Since the relay node 220-2 knows the pilot power Pbs used by the donor base station 220-1, the relay node 220-2 may instruct the user equipment 210 to report when the RSRP from the base station 220-1 exceeds the level:

$$Pbs \cdot \overline{Gd}$$

According to embodiments of the described method, the relay node 220-2 may handover the user equipment 210 to the donor base station 220-1, even if the RSRP of pilot signals received from the donor base station 220-1 is much weaker than the RSRP of pilot signals received from the relay node 220-2.

Observe that such a situation would be unacceptable in a heterogeneous network according to prior art, in which the low power nodes are synchronised and time aligned with the high power nodes, i.e., when the pilot signals are sent by the two nodes on the same resource block. Thus, the user equipment would not be able to decode the reference signals from the high power node.

However, it is understood that the donor base station 220-1 transmits its reference signals during the time-slots reserved for the backhaul 230, i.e., in one of the slots 0 to n in FIG. 3, while the relay node 220-2 sends its reference signals in one of the remaining time slots, i.e., from n+1 to 10. Therefore the pilot signals from the two respective network nodes 220-1, 220-2 are not colliding according to embodiments of the herein disclosed methods.

If the donor base station 220-1 does not implement the same algorithm, then it may immediately handover the user equipment 210 back to the relay node 220-2. Therefore the relay node 220-2 may apply this cell selection criterion, according to embodiments wherein the donor base station 220-1 implements the same criterion according to some embodiments.

The relay node 220-2 may blindly determine if the donor base station 220-1 used the same method or not according to some embodiments. For instance, the relay node 220-2 may randomly attempt to apply this technique and if all the attempts result in the donor base station 220-1 sending back the user equipment 210, then the relay node 220-2 may conclude that the donor base station 220-1 does not implement the method.

As an alternative, the relay node 220-2 may use a protocol to enquire the donor base station 220-1 on whether the method is available, and to commonly agree to use this technique, according to some embodiments. As yet another alternative, the use of this technique may be configured in both the donor base station 220-1 and the relay node 220-2 by an Operation and Maintenance (configuration) node, also by using an appropriate configuration protocol.

When the handover is done from the relay node 220-2 to another network node than the donor base station 220-1, then the relay node 220-2 may be helped by having information about whether the target network node is a base station or a relay node. For this purpose, the relay node 220-2 may be informed about the characteristics of its neighbouring base stations. If the target network node is known not to be another relay node, then the previously described procedure may be applied.

If the target network node is known to be a relay node, than the previously described procedure may not be applied, according to some embodiments.

Further, a scenario comprising a handover from the base station 220-1 to the relay node 220-2 will subsequently be described. The user equipment 210 is in this non-limiting scenario served by the base station 220-1 and thus the base station 220-1 has to decide whether to handover the user equipment 210 to the relay node 220-2 or not. The entire procedure ought to be applied to any user equipment 210 connected to the base station 220-1 according to some embodiments.

Since the user equipment 210 is connected to the base station 220-1, the base station 220-1 may measure (estimate) the pathgain Gd and the bit-rate BRd in the direct link 240 between the base station 220-1 and the user equipment 210.

Moreover, the base station 220-1 may measure the pathgain Gb in the backhaul link 230 by requesting the relay node 220-2 to report the RSRP for the base station 220-1. Moreover, the base station 220-1 may monitor the bit-rate per resource element BRb, for instance based on the modulation and coding schemes used on the backhaul link 230.

However, in order for the base station 220-1 to estimate the pathgain Ga in the potential link between the relay node 220-2 and the user equipment 210, the base station 220-1 cannot use the same procedure used by the relay node 220-2 to find out the pathgain Gd. For this purpose, the base station 220-1 needs to be informed by the relay node 220-2 about the power it uses for its reference signals. As of today, no protocol is available for transferring this information. Therefore the user equipment 210 may measure the RSRP of pilot signals received from the relay node 220-2 and reports it to the base station 220-1. No other information about the potential link 250 between the relay node 220-2 and the user equipment 210 may be available at the base station 220-1, according to some embodiments.

Further, the next action may be to process the measurements by estimating the data-rate per resource element in the link 250 between the relay node 220-2 and the user equipment 210. According to some embodiments, the RSRP reported by the user equipment 210 may be mapped to a bit-rate using an analytic expression of the type:

$$\overline{BR} = \min\{\log_2(1 + RSRP \cdot \beta, BR\max)\}$$

Where β is a suitably selected parameter. For instance:

$$\beta = (2^{BRd} - 1)/RSRFd$$

Other non-linear analytic mapping functions or a (synthetic) look-up function of the form:

$$\overline{BR} = g(RSRP)$$

which may be used instead. Then the bit-rate per resource element in the link 250 between the relay node 220-2 and the user equipment 210 may be estimated by:

$$\overline{BRa} = g(RSRPa)$$

and the end-to-end bit-rate per resource element for the relay-path 250 may be estimated by:

$$\overline{BRm} = \frac{\overline{BRa} \cdot BRb}{\overline{BRa} + BRb}$$

The base station 220-1 may decide to initiate the handover procedure toward the relay node 220-2 if:

$$\overline{BRm} > BRd$$

The base station 220-1 labels the user equipment 210 as belonging to the normal base station cell 261 if:

$$RSRPd > RSRPa + \delta_{[dB]}$$

The user equipment 210 may be labelled as belonging to the extended base station cell 262 otherwise. The parameter δ may be used to control the share between the normal base station cell 261, and the extended BS cell 262. A negative value of δ may mean that the size of the extended base station cell 262 may be small and relatively few user equipment units 210 connected directly to the base station 220-1 may be protected from the downlink interference generated by the relay node 220-2. Conversely, very large values of the parameter 5 means that all the user equipment 210 connected to the base station 220-1 may be protected from the downlink interference generated by the relay node 220-2, and therefore the radio resources may not be reused. The parameter 5 may be set for instance as in prior art procedures for purely cellular HetNet according to some embodiments.

The user equipment 210 located in the extended base station cell 262 may be scheduled so as to avoid interference from/to the relay node 220-2, which otherwise may disturb the reception of signals.

According to embodiments of the aforementioned method actions, the base station 220-1 may not initiate a handover procedure to the relay node 220-2 even if the RSRP from the relay node 220-2 is significantly stronger than the RSRP from the base station 220-1. The base station 220-1 may simply ignore the measurement reports send by the user equipment 210 and execute the handover only when the aforementioned handover criterion is fulfilled, according to some embodiments.

In order to reduce the amount of measurement reports sent by the user equipment 210, the base station 220-1 may configure the user equipment 210 with a measurement reporting threshold, which may be computed as follows.

Given the measured/estimated bit-rates on the direct link 240 and the backhaul link 230, respectively, the base station 220-1 may estimate the necessary bit-rate BRa in the relay access link 250, so that the equivalent bit-rate on the relay path 230, 250 is as good as the current bit-rate on the direct link 240:

$$\overline{BRa} = \frac{BRb \cdot BRd}{BRb - BRd}$$

If the necessary bit-rate exceeds the maximum achievable data rate BRmax then the user equipment 210 may be instructed not to report any measurement from the relay node 220-2. However, if the necessary bit-rate is achievable, then the user equipment 210 may be configured to report when the RSRP from the relay node 220-2 exceed the value:

$$RSRPa = g^{-1}(\overline{BRa})$$

Figure 4:
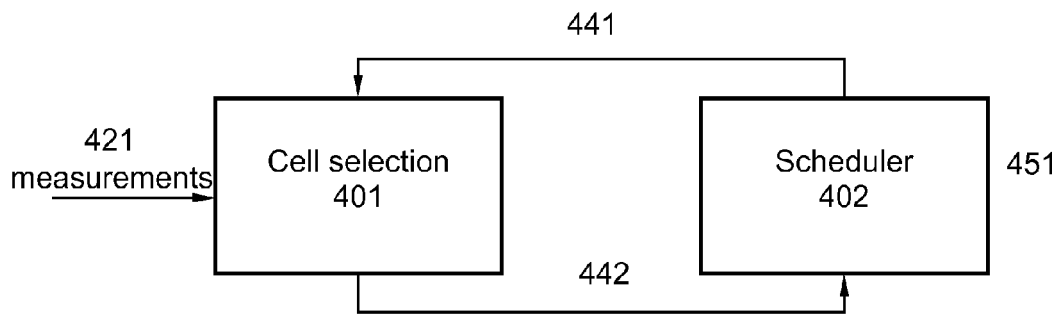
FIG. 4 is a schematic flow chart illustrating an embodiment of a feature of the present method.

FIG. 4 schematically illustrates the interaction between the aforementioned cell selection mechanism 401 and the interference avoidance technique made by appropriate scheduling in the scheduler 402.

The interaction may be an advantage for the cell selection, because the problem of degraded bit-rates for the cell-edge user equipment 210 may be solved by the cell selection 401 even better if the herein presented interference avoidance technique are available and applied. Moreover, the interaction may bring an advantage also for the interference avoidance technique because the cell selection 401 according to some embodiments may classify the user equipment 210, as part of the handover decision process.

The cell selection mechanism 401 may receive, from the scheduler 402, an indication 441 of whether interference protection is to be utilized or not. The indication 441 may be negative if the scheduler 402 does not implement it; or e.g. in case the license for using the interference protection has expired; or if the feature cannot be temporarily used due to high load or other Quality of Service (QoS) considerations.

Figure 5:
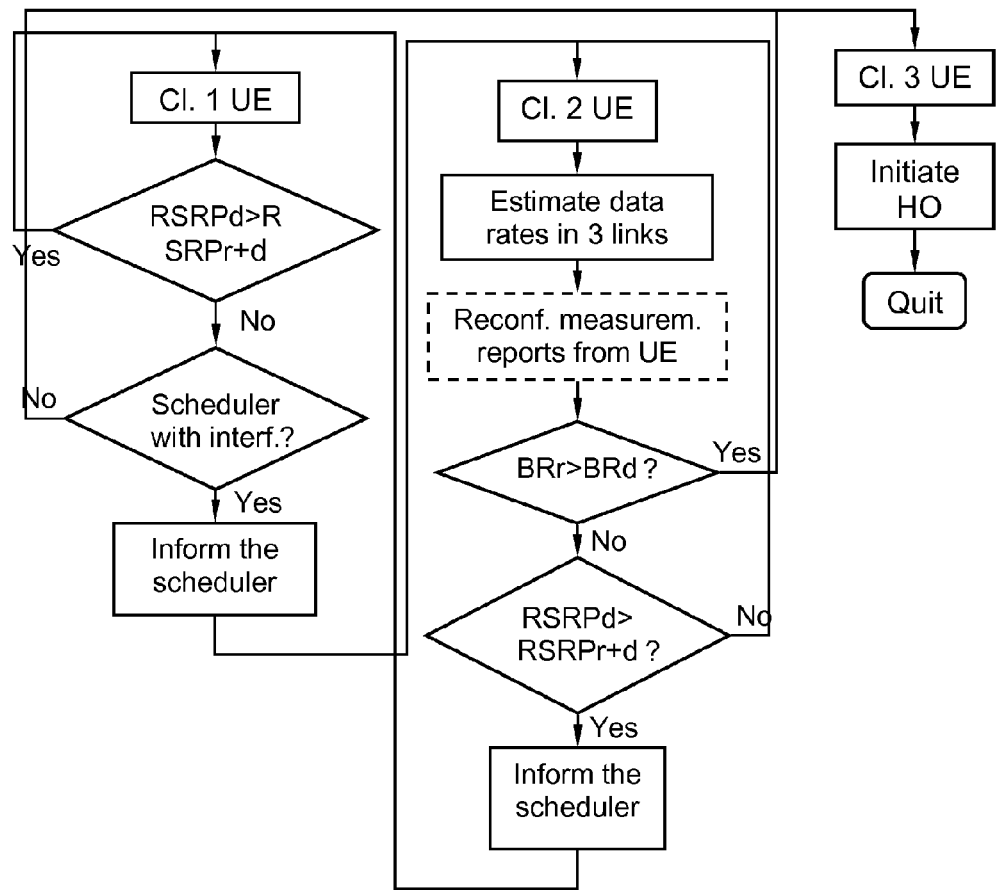
FIG. 5 is a schematic flow chart illustrating examples of an embodiment of a feature of the present method.

Moreover, the cell selection mechanism 401 may according to some embodiments classify the user equipment 210 into regular base station cell 261 coverage user equipment units and extended base station cell 262 coverage user equipment units, as illustrated in FIG. 5. A user equipment 210 thus belongs to the first class if it fulfils the conditions of a classical HetNet cell selection of the base station cell 261. For instance this means that the RSRP from the base station 220-1 is larger than the RSRP from the relay node 220-2, plus e.g. some handover threshold 5. If this condition is not fulfilled and the scheduler 402 does not have the interference protection feature, then the user equipment 210 may be handed over to the relay node 220-2. However, if the condition is not fulfilled and the interference protection is available, then the user equipment 210 may be added to the list of class 2 user equipment units since it belongs to the extended base station cell 262. The bit-rates in the three links 230, 240, 250 are monitored for the user equipment units in the class 2, and the handover to the relay node 220-2 may be initiated when the estimated bit-rate for the relaying path exceeds the current bit-rate. As an option, the measurement reports may be reconfigured so as to reduce the amount of signalling.

These classifications are signaled 442 to the scheduler 402, for instance as two lists of user equipment identifiers, so that the scheduler 402 may treat user equipment units in the extended cell are 262 protected by the scheduler 402.

The donor base station 220-1 does not with necessity need to know whether the relay node 220-2 implements the same method. In fact the base station 220-1 may extend its coverage range for some user equipment 210 according to some embodiments, even if the relay node 220-2 does not implement the same cell selection, by simply not handing them over to the relay node 220-2. This may apply only to the user equipment 210 that are already served by the base station 220-1.

Hence the donor base station 220-1 may not need to detect or adapt its operation to the relay node 220-2.

However, handover may be considered to a relay node controlled by another base station. In such scenario, the base station 220-1 may acquire further information for determining whether the target network node is a base station or a relay node, and the characteristics of the target network node. Furthermore, if the target network node is a relay node, then the base station 220-1 may take further advantage of knowing information about the characteristics of the backhaul link for that relay node, for instance the bit-rate on the other backhaul link. This may be done by letting the base station 220-1 subscribe to measurement reports about the bit-rate on the neighbouring backhauls, using an information exchange protocol.

However, it may be considered unlikely that the base station 220-1 will have very good pathgain to user equipment 210 which is to be handed over to a relay node connected to another base station. Therefore it may be less critical to apply embodiments of the methods herein described in such case.

Subsequently, yet a non-limiting embodiment of the method is disclosed. The embodiment comprises a cell selection method in a donor base station 220-1 for improving the data-rates of a user equipment 210 in a cellular-relaying network. The method may comprise collecting information about the type of neighbouring network nodes and identifying which of them are relay nodes 220-2 connected to the donor base station 220-1. Further, the method may comprise collecting information about the capability of a scheduler unit to protect the user equipment 210 and the relay node 220-2 from interference. Additionally, the method may comprise sending auto-configuring measurement commands to the user equipment 210. Also, in further addition, cell reselection of user equipment 210 in active mode may be executed, based on information about scheduler capability and data-rate performance in the direct link 240 between the donor base station 220-1 and the user equipment 210 and/or the backhaul link 230 between the donor base station 220-1 and the relay node 220-2 and/or the link 250 between the user equipment 210 and the relay node 220-2. Further, embodiments of the method may comprise informing the scheduler which user equipment 210 may be interference-protected.

Embodiments of the method may aim at improving the date rate for the user equipment 210 by using information about scheduler capabilities and/or measurement reports from the user equipment 210 and/or data-rate estimates in three links 230, 240, 250, and/or information about the neighbouring network nodes 220-1, 220-2. The method may comprise the actions of classifying the user equipment 210 as belonging to one of three possible radio condition classes, depending on where the user equipment 210 is considered situated. If the user equipment 210 is considered situated in the regular base station cell 261, it may be associated with the first radio condition class. If the user equipment 210 is considered situated in the extended base station cell 262, it may be associated with the second radio condition class and if the user equipment 210 is considered situated in the relay cell 270, it may be associated with the third radio condition class, according to some embodiments. Further, the method may comprise instructing the scheduler to interference-protect user equipment 210 associated with the second class. In addition, the method may comprise initiating cell reselection procedures so as to hand over user equipment 210 associated with the third class to other cells, i.e. neighbour network nodes.

However, according to some embodiments, embodiments of the method may comprise classifying user equipment 210 as belonging to a first class if a first condition is fulfilled and as belonging to second class if a second condition is fulfilled. The first condition may be based on measurements reported by the user equipment 210, such as e.g. RSRP measurements in an LTE network. The second condition may be based on information about the scheduler capabilities and/or data-rate rate estimates in three links 230, 240, 250, and/or information about the capabilities of the neighbouring network nodes.

Embodiments of the method may comprise cell selection in the relay node 220-2 for improving the data-rate of the user equipment 210 in the cellular-relaying network by detecting whether the donor base station 220-1 implements a compatible cell selection method. Further, embodiments of the method may comprise sending auto-configuring measurement commands to the user equipment 210 and executing cell reselection of the user equipment 210, if it is in active mode, to the donor base station 220-1 based on information about the data-rate performance in the direct link 240 between the donor base station 220-1 and the user equipment 210 and/or the backhaul link 230 between the donor base station 220-1 and the relay node 220-2 and/or the link 250 between the user equipment 210 and the relay node 220-2.

Figure 6:
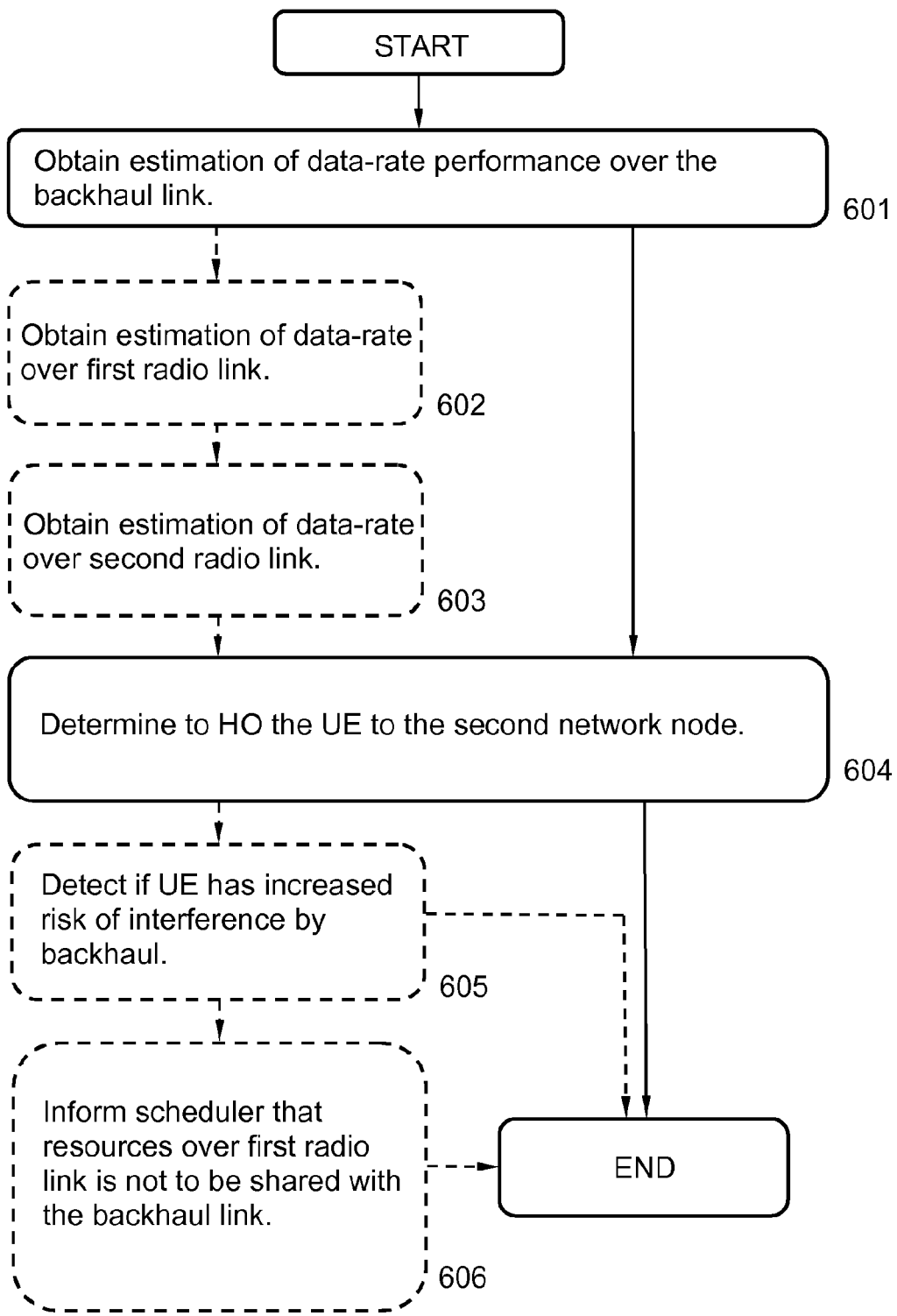
FIG. 6 is a schematic flow chart illustrating examples of actions comprised in embodiments of the present method in a network node.

FIG. 6 is a flow chart illustrating embodiments of a method in a first network node 220-1. The first network node 220-1 is serving a user equipment 210. The method aims at determining if a handover of the user equipment 210 is to be made to a second network node 220-2. The first network node 220-1 and the second network node 220-2 are configured for wireless communication with each other over a backhaul link 230 in half-duplex communication mode.

The wireless communication system 100 may be based on Long-Term Evolution (LTE) within the Third Generation Partnership Project (3GPP) according to some embodiments, wherein the first network node 220-1 and the second network node 220-2 may have a base station-relay node relationship. The first network node 220-1 may comprise a base station such as an Evolved Node B, and the second network node 220-2 may comprise a relay node according to some embodiments.

The method may according to some embodiments comprise obtaining an estimation of a Signal-to-Noise Ratio for the backhaul link 230. Further, the method may according to some embodiments wherein the first network node 220-1 comprises a base station, and the second network node 220-2 comprises a relay node, be performed if the estimated Signal-to-Noise Ratio for the backhaul link 230 is lower than a first backhaul threshold value. Otherwise, if the Signal-to-Noise Ratio of the backhaul link 230 is too high, it may be determined immediately to not handover the user equipment 210, but to keep letting the first network node 220-1/base station be the serving network node.

However, if the situation is the opposite, i.e. that the first network node 220-1 comprises a relay node, and the second network node 220-2 comprises a base station, the method may further comprise, making the handover of the user equipment 210 instantly, without further computations, to the second network node 220-2, if the estimated Signal-to-Noise Ratio for the backhaul link 230 is higher than a second backhaul threshold value.

High Signal-to-Noise Ratio for the backhaul link 230 thus signifies that it is an advantage to let the base station be the serving node of the user equipment 210, as it may increase the total through put for the user equipment 210.

Further the method may, according to some embodiments comprise collecting information about the second network node 220-2, and/or any other neighbour network node and identifying the second network node 220-2 as either a base station or a relay node, and also determine compatibility with the described handover method.

Additionally, the method may, according to some embodiments comprise, for avoiding ping-pong effects related to the handover of user equipment 210 to the second network node 220-2, determining whether the second network node 220-2 implements a handover criterion compatible to the one implemented in the first network node 220-1, and refraining from performing the handover based on a computed end-user data-rate estimate if the first network node 220-1 does not implement a compatible handover algorithm.

The method may furthermore according to some embodiments, comprise to determine the compatibility by sending a request for configuration message to be received by the second network node 220-2, and receiving, in response to the sent request, a configuration message comprising information about handover criterion, from the second network node 220-2.

The compatibility may further according to some embodiments be determined blindly by observing failed attempts to handover the user equipment 210 to the second network node 220-2 based on the end-user data-rate estimates, instead of the RSRP measurements.

Also, the method according to some embodiments may be performed only if the user equipment 210 is in active mode. Thereby, it is avoided to make handover of user equipment 210 which anyway is not in active state and thus neither take advantage of the improved performance enabled by the present method, nor contribute to any interference.

To appropriately determine if a handover of the user equipment 210 is to be made to a second network node 220-2, the method may comprise a number of actions 601-606.

It is however to be noted that some of the described actions, e.g. action 601-603 may be performed in a somewhat different chronological order than the enumeration indicates. Also, it is to be noted that some of the actions such as e.g. 602, 603, 605 and/or 606 may be performed within some alternative embodiments. Further, any, some or all actions, such as e.g. 601, 602 and/or 603 may be performed simultaneously or in a rearranged chronological order. The method may comprise the following actions:

Action 601

An estimation of data-rate performance over the backhaul link 230 is obtained.

The estimation of data-rate performance over the backhaul link 230 may, according to some embodiments, wherein the first network node 220-1 comprises a base station and the second network node 220-2 comprises a relay node, be based on a report received from the second network node 220-2, comprising a measurement of strength of a reference signal that the second network node 220-2 has received from the first network node 220-1.

However, according to some other embodiments, wherein the first network node 220-1 comprises a relay node and the second network node 220-2 comprises a base station, the estimation of data-rate performance over the backhaul link 230 may be made forcing the second network node 220-2 to send an updated information element PDSCH-Config.

The data-rate performance over the backhaul link 230 may be estimated at a time interval which may be predetermined, configurable or randomly selected, according to different embodiments. In between the estimations, the data-rate performance over the backhaul link 230 may be approximated to be constant i.e. non-fluctuating, according to some embodiments. Thereby may the data-rate performance over the backhaul link 230 not have to be intensely recalculated in an iterative manner, whereby computer power and time may be saved.

However, according to other embodiments wherein it is known that any of the first network node 220-1 or the second network node 220-2 are non-stationary, such as e.g. mounted on a vehicle, or otherwise be situated in an environment in which the radio propagation conditions may be expected to vary, the data-rate performance over the backhaul link 230 may be estimated more frequently according to some embodiments.

Action 602

This action may be comprised within some alternative embodiments, but not necessarily within all imaginable embodiments of the method.

An estimation of data-rate performance over a first radio link 240 between the first network node 220-1 and the user equipment 210 may be obtained.

The estimation of data-rate performance over the first radio link 240 may, according to some embodiments, wherein the first network node 220-1 comprises a base station and the second network node 220-2 comprises a relay node, comprise measuring at least one of the RSRP measurement and/or pathgain measurement and/or the data-rate performance over the first radio link 240.

According to some embodiments, wherein the first network node 220-1 comprises a relay node and the second network node 220-2 comprises a base station, the estimation of data-rate performance over the first radio link 240 may be based on a report of received signal strength received from the user equipment 210.

Action 603

This action may be comprised within some alternative embodiments, but not necessarily within all imaginable embodiments of the method.

An estimation of data-rate performance over a second radio link 250 between the second network node 220-1 and the user equipment 210 may be obtained.

The estimation of data-rate performance over the second radio link 250 may, according to some embodiments, wherein the first network node 220-1 comprises a base station and the second network node 220-2 comprises a relay node, may be based on a measurement made by the user equipment 210 concerning strength of a reference signal transmitted by the second network node 220-2, and also on a report received from the second network node 220-2 comprising information on the used power for transmitting the reference signal.

According to some embodiments, wherein the first network node 220-1 comprises a relay node and the second network node 220-2 comprises a base station, the estimation of data-rate performance over the second radio link 250 be made by obtaining a value of a power used by the second network node 220-2 for transmitting a reference signal to be received by the user equipment 210. Further, a measurement made by the user equipment 210 of the strength of the reference signal received from the second network node 220-2, may be received. Thereafter may the strength of the reference signal measured by the user equipment 210 be subtracted from the value of the power used by the second network node 220-2 for transmitting the reference signal.

Action 604

It may be determined to handover the user equipment 210 to the second network node 220-2. The decision of determining to handover the user equipment 210 to the second network node 220-2 is based on the obtained 601 estimation of the data-rate performance over the backhaul link 230.

According to some embodiments, the decision of determining to handover the user equipment 210 to the second network node 220-2 may be further based on the obtained 602 estimation of data-rate performance over the first radio link 240 between the first network node 220-1 and the user equipment 210. In further addition, according to some embodiments, the decision of determining to handover the user equipment 210 to the second network node 220-2 may be further based on the obtained 603 estimation of data-rate performance over the second radio link 250 between the second network node 220-2 and the user equipment 210.

For example, according to some embodiments the decision of determining to handover the user equipment 210 to the second network node 220-2 may alternatively be based on a comparison between the obtained 602 estimation of data-rate performance over the first radio link 240 between the first network node 220-1 and the user equipment 210 and a threshold value. Additionally, the handover decision may be based on a comparison between the obtained 603 estimation of data-rate performance over the second radio link 250 between the second network node 220-2 and the user equipment 210 and a threshold value.

According to some embodiments, wherein the first network node 220-1 comprises a base station and the second network node 220-2 may comprise a relay node, the determination to handover the user equipment 210 to the second network node 220-2 may be made if the resulting data-rate performance over the backhaul link 230 and data-rate performance over the second radio link 250 between the second network node 220-1 and the user equipment 210 is bigger than the data-rate performance over the first radio link 240 between the first network node 220-1 and the user equipment 210.

However, according to some further embodiments, wherein the first network node 220-1 may comprise a relay node and the second network node 220-2 may comprise a base station, the determination to handover the user equipment 210 to the second network node 220-2 may be made if the data-rate performance over the second radio link 250 between the second network node 220-2 and the user equipment 210 is bigger than the resulting data-rate performance over the first radio link 240 between the first network node 220-1 and the user equipment 210 in addition to the data-rate performance over the backhaul link 230.

If it is determined not to handover the user equipment 210 to the second network node 220-2, then the first network node 220-1 may continue to be the serving node of the user equipment 210 and no further actions may be performed. Further, the previously described actions 601, 602, 603 and/or 604 may be re-performed instantly, or after a certain time period has past, according to some embodiments. Thus e.g. a watch dog timer functionality may be activated after the decision not to handover the user equipment 210, ascertaining that any of the actions 601, 602, 603 and/or 604 are not re-performed until the certain time period has passed. The certain time period may be predetermined or configurable, according to different embodiments. Thereby, by enforcing a waiting time before re-performing the actions 601, 602, 603 and/or 604 comprised in the method, computing resources and possibly also redundant signalling are saved, in case e.g. the user equipment 210 is stationary, or the radio propagation conditions otherwise may be approximated to be constant within the certain time period within the first cell 260.

Action 605

This action may be comprised within some alternative embodiments, but not necessarily within all imaginable embodiments of the method.

It may be detected, based on measurements of received signal strength, made by the user equipment 210 on reference signals received by the user equipment 210 from the first network node 220-1 and the second network node 220-2, respectively, if the user equipment 210 has an increased risk of being interfered by transmissions made over the backhaul link 230. In particular, this action may be performed in embodiments wherein the first network node 220-1 comprises a base station.

Such detection may be made according to the actions described in conjunction with FIG. 5, such that the user equipment 210 is considered to be in the second class; or to be situated in the extended base station cell 262.

Action 606

This action may be comprised within some alternative embodiments, but not necessarily within all imaginable embodiments of the method. In particular, this action may be performed if it is detected 605 that the user equipment 210 has an increased risk of being interfered by transmissions made over the backhaul link 230.

The scheduler 402 may be informed that the scheduling of resources over the first radio link 240 between the first network node 220-1 and the user equipment 210 may not to be shared with the resources scheduled over the backhaul link 230. The scheduler 402 may be comprised within the donor base station.

Thereby may interference between signals transmitted over the backhaul link 230 and the first radio link 240 between the first network node 220-1 and the user equipment 210 be omitted, or at least somewhat reduced.

The method, according to some embodiments may furthermore comprise receiving a measurement of received signal strength from the user equipment 210, measured over the first radio link 240, and also receiving a measurement of received signal strength from the user equipment 210, measured over the second radio link 250.

Further, the method may additionally comprise instructing the user equipment 210 to not report any signal strength measurements, if they are smaller than a threshold value, according to some embodiments. Thereby is unnecessary uplink signalling omitted, or at least reduced, which saves signalling resources and reduced interference within the wireless communication system 200, according to some embodiments.

The scheduler 402 may according to some embodiments be informed that the user equipment 210 may be to be scheduled so as to avoid interference from the second network node 220-2 if the received signal strength measured over the second radio link 250+a parameter δ is bigger than the received signal strength measured over the first radio link 240. Thereby is interference omitted, avoided or somewhat diminished, according to some embodiments.

Figure 7:
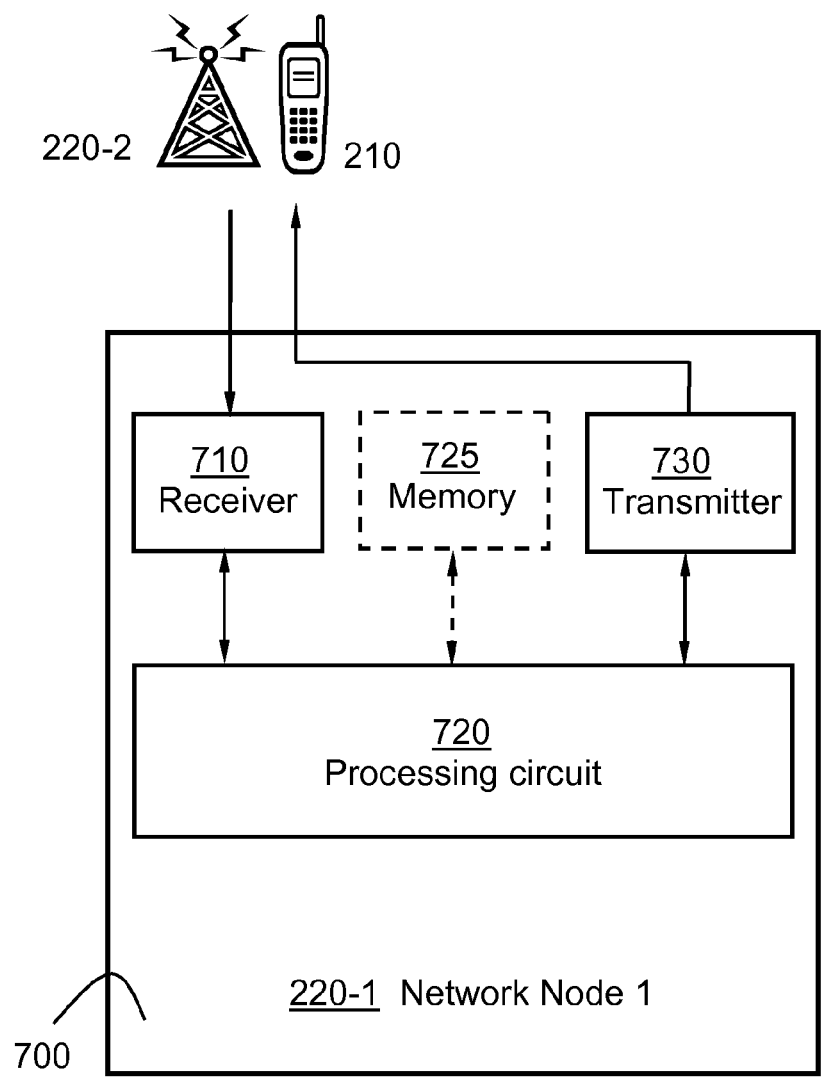
FIG. 7 is a schematic block diagram illustrating an embodiment of an arrangement in a network node.

FIG. 7 is a block diagram illustrating an arrangement 700 in a first network node 220-1, which is serving a user equipment 210. The arrangement 700 is configured to perform any, some or all of the actions 601-606 for determining if a handover of the user equipment 210 is to be made to a second network node 220-2.

The first network node 220-1 and the second network node 220-2 are configured for wireless communication over a backhaul link 230 in half-duplex communication mode.

For the sake of clarity, any internal electronics or other components of the first network node 220-1, not completely indispensable for understanding the present method has been omitted from FIG. 7.

In order to perform the actions 601-606 correctly, the arrangement 700 comprises a processing circuit 720, configured to obtain an estimation of data-rate performance over the backhaul link 230. The processing circuit 720 is also configured to determine if handover of the user equipment 210 is to be made to the second network node 220-2, based on the obtained estimation of the data-rate performance over the backhaul link 230.

Further, according to some embodiments, the processing circuit 720 may be configured to obtain an estimation of data-rate performance over a first radio link 240 between the first network node 220-1 and the user equipment 210. Additionally the processing circuit 720 may be configured to obtain an estimation of data-rate performance over a second radio link 250 between the second network node 220-1 and the user equipment 210. In further addition, the processing circuit 720 may be configured to detect based on measurements of received signal strength, made by the user equipment 210 on reference signals received by the user equipment 210 from the first network node 220-1 and the second network node 220-2, respectively. Also, the processing circuit 720 alternatively may be configured to schedule resources over the first radio link 240 between the first network node 220-1 and the user equipment 210 is not to be shared with the resources scheduled over the backhaul link 230. Additionally, the processing circuit 720 may further be configured to estimate a Signal-to-Noise Ratio for the backhaul link 230. Also, the processing circuit 720 may additionally further be configured to collect information about the second network node 220-2, and to identify the second network node 220-2 as either a base station or a relay node, and also determining compatibility with the method according to actions 601-606.

In addition, the processing circuit 720 may be further configured to detect, based on measurements of received signal strength, made by the user equipment 210 on reference signals received by the user equipment 210 from the first network node 220-1 and the second network node 220-2, respectively, if the user equipment 210 has an increased risk of being interfered by transmissions made over the backhaul link 230, and the processing circuit 720 may be further configured to inform the scheduler that the scheduling of resources over the first radio link 240 between the first network node 220-1 and the user equipment 210 is not to be shared with the resources scheduled over the backhaul link 230.

In some embodiments, wherein the first network node 220-1 comprises a base station and the second network node 220-2 comprises a relay node, the processing circuit 720 may be further configured to determine to handover the user equipment 210 to the second network node 220-2 if the resulting data-rate performance over the backhaul link 230 and data-rate performance over the second radio link 250 between the second network node 220-1 and the user equipment 210 is bigger than the data-rate performance over the first radio link 240 between the first network node 220-1 and the user equipment 210. Further, the processing circuit 720 in addition may be configured to obtain an estimation of a Signal-to-Noise Ratio for the backhaul link 230, and to compare the obtained Signal-to-Noise Ratio for the backhaul link 230 with a first backhaul threshold value.

The processing circuit 720 may further according to some embodiments be configured to schedule the user equipment 210 so as to avoid interference from the second network node 220-2 if the received signal strength measured over the second radio link 250+a parameter δ is bigger than the received signal strength measured over the first radio link 240.

However, in some embodiments wherein the first network node 220-1 comprises a relay node and the second network node 220-2 comprises a base station, the processing circuit 720 may be further configured to determine to handover the user equipment 210 to the second network node 220-2 if the data-rate performance over the second radio link 250 between the second network node 220-2 and the user equipment 210 is bigger than the resulting data-rate performance over the first radio link 240 between the first network node 220-1 and the user equipment 210 in addition to the data-rate performance over the backhaul link 230. Also, furthermore, the processing circuit 720 may in addition be configured to obtain an estimation of a Signal-to-Noise Ratio for the backhaul link 230. Also the processing circuit 720 may further be configured to decide to handover the user equipment 210 instantly, without further computations, to the second network node 220-2, if the estimated Signal-to-Noise Ratio for the backhaul link 230 is higher than a second backhaul threshold value. Additionally, the processing circuit 720 may be further configured to estimate the data-rate performance over the first radio link 240, based on the report of received signal strength received from the user equipment 210.

Further, the arrangement 700 may also in some embodiments be also configured to collect information about the second network node 220-2, identifying the second network node 220-2 as either a base station or a relay node, and also configured to determine compatibility with the method according to any, some or all of actions 601-606.

The processing circuit 720 may comprise e.g. one or more instances of a Central Processing Unit (CPU), a processing unit, a processor, a microprocessor, or other processing logic that may interpret and execute instructions. The processing circuit 720 may further perform data processing functions for inputting, outputting, and processing of data comprising data buffering and device control functions, such as call processing control, user interface control, or the like.

The arrangement 700 may further comprise a receiver 710. The receiver 710 may be configured to receive wireless signals from the user equipment 210, and/or from the second network node 220-2. Further, the receiver 710 may be configured to receive a measurement of received signal strength from the user equipment 210, measured over the first radio link 240. In addition, the receiver 710 may also be configured to receive a measurement of received signal strength from the user equipment 210, measured over the second radio link 250, according to some embodiments.

In addition, the arrangement 700 may comprise a transmitter 730 according to some embodiments. The transmitter 730 may be arranged to transmit wireless signals to the user equipment 210, and/or the second network node 220-2. The transmitter 730 may according to some embodiments be configured to transmit an instruction to be received by the user equipment 210, instructing the user equipment 210 to not report any signal strength measurements, if they are smaller than a threshold value.

According to some embodiments, the arrangement 700 may comprise at least one memory 725. The memory 725 may comprise a physical device utilized to store data or programs i.e. sequences of instructions, on a temporary or permanent basis. According to some embodiments, the memory 725 may comprise integrated circuits comprising silicon-based transistors. Further, the memory 725 may be volatile or non-volatile. The network node 110 may further according to some embodiments comprise at least one volatile memory 725 and also at least one non-volatile memory 725.

Further, it is to be noted that some of the described units 710-730 comprised within the arrangement 700 in the wireless communication system 200 are to be regarded as separate logical entities but not with necessity separate physical entities. To mention just one example, the receiver 710 and the transmitter 730 may be comprised or co-arranged within the same physical unit, a transceiver, which may comprise a transmitter circuit and a receiver circuit, which transmits outgoing radio frequency signals and receives incoming radio frequency signals, respectively, via an antenna. The radio frequency signals transmitted between the first network node 220-1, the second network node 220-2 and the user equipment 210 may comprise both traffic and control signals e.g. paging signals/messages for incoming calls, which may be used to establish and maintain a voice call communication with another party or to transmit and/or receive data, such as SMS, e-mail or MMS messages, with a remote user equipment, or other node comprised in the wireless communication system 100.

The actions 601-606 to be performed in the first network node 220-1 may be implemented through one or more processing circuits 720 in the first network node 220-1, together with computer program code for performing the functions of the present actions 601-606. Thus a computer program product, comprising instructions for performing the actions 601-606 in the first network node 220-1 may determine to handover the user equipment 210 is to be made to a second network node 220-2, when being loaded into the one or more processing circuits 720.

The computer program product mentioned above may be provided for instance in the form of a data carrier carrying computer program code for performing at least some of the actions 601-606 according to some embodiments when being loaded into the processing circuit 720. The data carrier may be e.g. a hard disk, a CD ROM disc, a memory stick, an optical storage device, a magnetic storage device or any other appropriate medium such as a disk or tape that may hold machine readable data in a non transitory manner. The computer program product may furthermore be provided as computer program code on a server and downloaded to the user equipment 210 remotely, e.g. over an Internet or an intranet connection.

Figure 8:
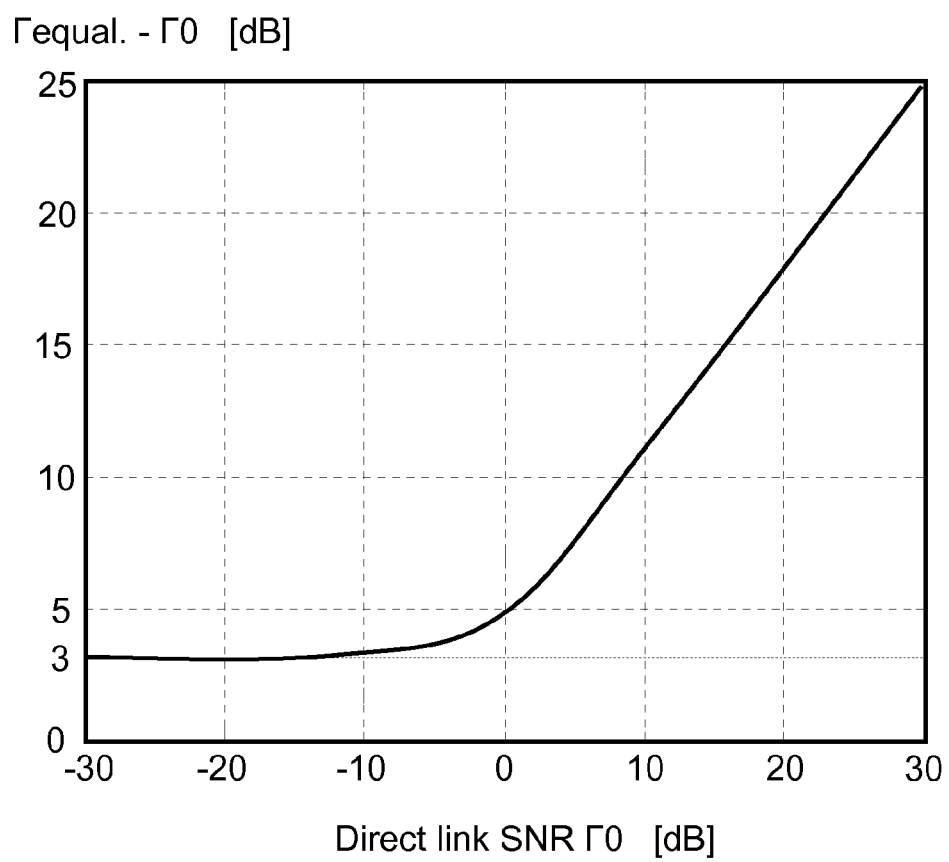
FIG. 8 is a diagram illustrating a relation between link quality values, according to embodiments of the present method.

FIG. 8 shows how much better than the direct link 240, the equivalent relaying path i.e. over the backhaul link 230+the link 250 between the relay node 220-2 and the user equipment 210 must be in order for the two paths to yield the same average-data rate. FIG. 8 is drawn by assuming an ideal Additive White Gaussian Noise (AWGN) channel, e.g. using Shannon's information theoretical capacity, and by assuming that the available time-slot is split into two equal sub-slots between the backhaul link 230 and the user equipment-to-relay node link 250.

A possible interpretation of FIG. 8 may be: if the backhaul link 230 is perfect (infinite SNR) and the direct link 240 between the base station 220-1 and the user equipment 210 has a very low SNR, then the user equipment 210 may connect through the relay node 220-2 if the signal received on the user equipment-to-relay node link 250 to be 3 dB larger then the signal received on the user equipment-to-base station link 240. Roughly speaking, for a user equipment 210 with low RSRP from the base station 220-1, the handover margin to the relay node 220-2 may be set to 3 dB. However, if the SNR in the direct connection 240 is quite good, then the SNR in the user equipment-relay node link 250 must be much better. For instance, if the direct link 240 has 0 dB then the handover threshold may be set to 5 dB; if the direct link 240 has 10 dB, then the handover threshold may be set to 20 dB, and so on.

According to some embodiments, an exchange of information between the serving network node 220-1 and its neighbouring network node 220-2 may be made, which exchanged information may comprise information concerning e.g. the type of the cell, transmitted power, and configuration of the slot allocation, particularly for relay nodes 220-2.

Additionally, according to some embodiments, information about e.g. the type of neighbouring cell, transmission power of the neighbouring cell, and Multi-Media Broadcast over a Single Frequency Network (MBFSN) slot structure may be used to set power offsets.

Figure 9:
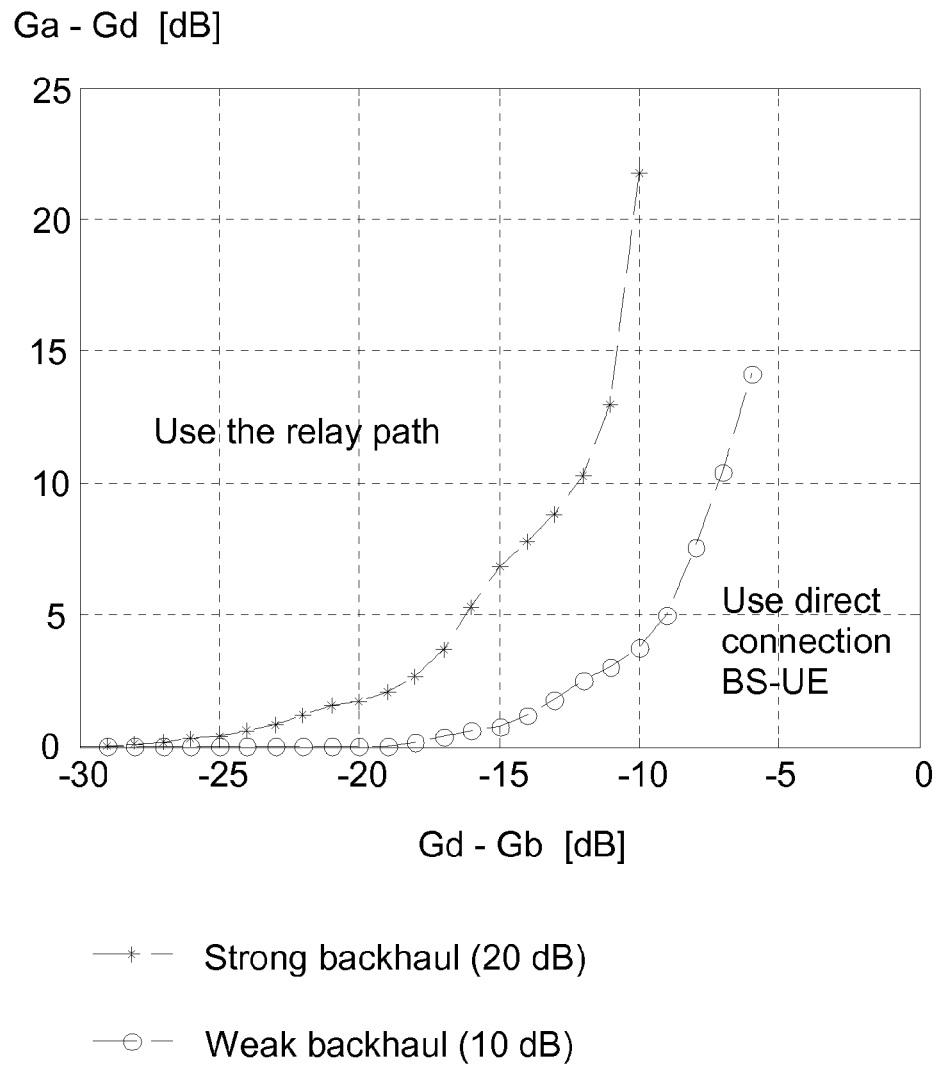
FIG. 9 is a diagram illustrating a relation between link quality values and handover threshold values, according to embodiments of the present method.

Regarding the procedure of setting the handover threshold, FIG. 9 shows that (a) the information about the quality of the backhaul link 230 may have a certain influence, and (b) the configuration of the handover threshold is not trivial. This non-limiting example uses the model of a practical receiver, for which there is a maximum achievable data-rate, unlike an information-theoretical model which provides unlimited data-rate as long as the SNR is high enough. Moreover, the available time slot may be split in two parts of arbitrary size, not necessarily in two equally long sub-slots.

Despite the flexible resource allocation, the user equipment 210 may not choose the relay node 220-2 when the direct link 240 is very good. This corresponds to an infinitely high handover threshold, illustrated in the FIG. 9 by the asymptotic behaviour of the two curves. It means that if the direct link 240 between the base station 220-1 and the user equipment 210 is too good, then the comparison with the relay path 250 may not even be made according to some embodiments, as the user equipment 210 anyway may not select the relay node 220-2 in such case. Thereby may computation resources and time be saved.

Another observation is that the threshold may depend also on how good the backhaul link 230 is. If the backhaul link 230 is weak, such as e.g. 10 dB SNR, marked with circles in the FIG. 9, then the user equipment 210 may get routed through the relay node 220-2, only if the SNR in direct connection is below 5 dB lower than in the backhaul link 230, i.e., has an SNR of 10−5=5 dB. If the direct connection 240 is better than 5 dB, then the user equipment 210 may not connect to the relay node 220-2, no matter how close to the relay node 220-2 the user equipment 210 is getting. But if the backhaul 230 is good, such as e.g. 20 dB SNR, marked with stars in FIG. 9, then the user equipment 210 may get routed through the relay node 220-2 when the direct connection 240 is up to 10 dB.

This indicates that a threshold configuration based only on information about the backhaul subframe allocation, and the measurement reports received from the user equipment 210, but not on the quality of the backhaul link 230, is suboptimal.

The handover threshold according to some embodiments may thus be set individually for each user equipment 210, according to some embodiments.

The non limiting example in FIG. 9 is based on SNR measurements, which are tightly connected to the RSRP measurements made and reported by the user equipment 210. But according to this example, there might be cases when the user equipment 210 is placed right next to the relay node 220-2 and yet may select the donor base station cell 260.

Further it may be noted, by means of example and in order to simplify the comprehension, the term SNR has been consistently used in this text when describing a Signal to Noise Ratio, which is the ratio between the level of a desired signal to the level of background noise and signal disturbance. The higher the ratio, the less obtrusive is the background noise. However, there exist other acronyms which are sometimes used to describe the same or a similar ratio, like e.g. the Signal to Noise Ratio (SNR or S/N), Signal to Noise and Interference Ratio (SNIR), Signal to Interference and Noise Ratio (SINR) Signal to noise and Interference Ratio (SIR) or an inversion of the ratio, like Interference to Signal Ratio, (ISR). Any of these or similar ratios may be used in the context of this description instead of the SNR.

When using the formulation "comprise" or "comprising" within the present context, it is to be interpreted as non-limiting, i.e. meaning "consist at least of". The present methods and devices are not limited to the above described preferred embodiments. Various alternatives, modifications and equivalents may be used. Therefore, the above embodiments are not to be taken as limiting the scope of claimed protection, which instead is to be defined by the appending claims.

The invention claimed is:

1. A method in a base station, which is serving a user equipment, for determining whether a handover of the user equipment is to be made to a relay node, wherein the base station and the relay node are configured for wireless communication with each other over a backhaul link in half-duplex communication mode, the method comprising:
obtaining an estimation of data-rate performance over the backhaul link;
obtaining an estimation of data-rate performance over a first radio link between the base station and the user equipment;
obtaining an estimation of data-rate performance over a second radio link between the relay node and the user equipment; and
determining to hand over the user equipment to the relay node, based on end-to-end data rate performance including the obtained estimation of the data-rate performance over the half-duplex backhaul link between the base station and the relay node and the estimations of data-rate performance over the first and second radio links with the user equipment;
wherein the base station avoids Ping-Pong effects related to the handover of the user equipment to the relay node by:
determining whether the relay node implements a handover criterion compatible with the method in the base station; and
refraining from performing the handover based on a computed end-user data-rate estimate if the relay node does not implement a compatible handover criterion.

2. A method in a base station, which is serving a user equipment, for determining whether a handover of the user equipment is to be made to a relay node, wherein the base station and the relay node are configured for wireless communication with each other over a backhaul link in half-duplex communication mode, the method comprising:
obtaining an estimation of data-rate performance over the backhaul link;
determining to hand over the user equipment to the relay node, based on the obtained estimation of the data-rate performance over the backhaul link;
detecting, based on measurements of received signal strength, made by the user equipment on reference signals received by the user equipment from the base station and the relay node, respectively, whether the user equipment has an increased risk of being interfered by transmissions made over the backhaul link; and
when the user equipment has an increased risk of being interfered by transmissions made over the backhaul link, informing a scheduler that the scheduling of resources over the first radio link between the base station and the user equipment is not to be shared with the resources scheduled over the backhaul link.

3. The method according to claim 2, wherein
the determination to hand over the user equipment to the relay node is made if the resulting data-rate performance over the backhaul link and data-rate performance over the second radio link between the relay node and the user equipment is greater than the data-rate performance over the first radio link between the base station and the user equipment.

4. The method according to claim 3, further comprising:
obtaining an estimation of a Signal-to-Noise Ratio for the backhaul link;
wherein the method is only performed when the estimated Signal-to-Noise Ratio for the backhaul link is lower than a first backhaul threshold value.

5. The method according to claim 3, wherein:
the estimation of data-rate performance over the backhaul link is based on a report received from the relay node, the report comprising a measurement of strength of a reference signal that the relay node has received from the base station;
obtaining the estimation of data-rate performance over the first radio link comprises measuring at least one of a pathgain and the data-rate performance over the first radio link; and
the estimation of data-rate performance over the second radio link is based on a measurement made by the user equipment concerning strength of a reference signal transmitted by the relay node, and also on a report received from the relay node comprising information on the used power for transmitting the reference signal.

6. The method according to claim 3, further comprising:
receiving a measurement of received signal strength from the user equipment, measured over the first radio link; and
receiving a measurement of received signal strength from the user equipment, measured over the second radio link;
wherein, the scheduler is informed that the user equipment is to be scheduled so as to avoid interference from the relay node if the received signal strength measured over the second radio link plus a parameter $\delta$ is greater than the received signal strength measured over the first radio link.

7. The method according to claim 3, further comprising instructing the user equipment to not report any signal strength measurements, when the signal strength measurements are smaller than a threshold value.

8. The method according to claim 1, wherein:
the estimation of data-rate performance over the first radio link is based on a report of received signal strength received from the user equipment; and the estimation of data-rate performance over the second radio link is made by:
obtaining a value of a power used by the relay node for transmitting a reference signal to be received by the user equipment;
receiving a measurement made by the user equipment of the strength of the reference signal received from the relay node; and
subtracting the strength of the reference signal measured by the user equipment from the value of the power used by the relay node for transmitting the reference signal.

9. The method according to claim 2, further comprising collecting information about the relay node, the information identifying the second network node as a relay node; and
determining compatibility of the identified relay node with the method.

10. The method according to claim 2 wherein the method is performed only if the user equipment is in active mode.

11. The method according to claim 2, wherein the data-rate performance over the backhaul link is estimated at a time interval.

12. The method according to claim 1, wherein the compatibility is determined by the base station by:
sending a request-for-configuration message to be received by the relay node; and
receiving, in response to the sent request message, a configuration message comprising information about the handover criterion, from the relay node.

13. The method according to claim 1, wherein the compatibility is blindly determined by the base station by observing failed attempts to hand over the user equipment to the relay node based on the end-user data-rate estimates, instead of a measurement of the power of a received signal.

14. An arrangement in a base station, which is serving a user equipment, for determining whether a handover of the user equipment is to be made to a relay node, wherein the base station and the relay node are configured for wireless communication over a backhaul link in half-duplex communication mode, the arrangement comprising:
a non-transitory memory that stores computer program instructions; and
a processing circuit coupled to the memory, wherein when the processing circuit executes the computer program instructions, the processing circuit is caused to:
obtain an estimation of data-rate performance over the half-duplex backhaul link;
obtain an estimation of data-rate performance over a first radio link between the base station and the user equipment;
obtain an estimation of data-rate performance over a second radio link between the relay node and the user equipment;
determine to hand over the user equipment to the relay node, based on end-to-end data rate performance including the obtained estimation of the data-rate performance over the half-duplex backhaul link between the base station and the relay node and the estimations of data-rate performance over the first and second radio links with the user equipment; and
avoid ping-pong effects related to the handover of the user equipment to the relay node by:
determining whether the relay node implements a handover criterion compatible with the method in the base station; and
refraining from performing the handover based on a computed end-user data-rate estimate if the relay node does not implement a compatible handover criterion.

15. An arrangement in a base station, which is serving a user equipment, for determining whether a handover of the user equipment is to be made to a relay node, wherein the base station and the relay node are configured for wireless communication over a backhaul link in half-duplex communication mode, the arrangement comprising:
a non-transitory memory that stores computer program instructions; and
a processing circuit coupled to the memory, wherein when the processing circuit executes the computer program instructions, the processing circuit is caused to obtain an estimation of data-rate performance over the backhaul link, and to determine whether handover of the user equipment is to be made to the relay node, based on the obtained estimation of the data-rate performance over the backhaul link, wherein the processing circuit is further configured to:
detect, based on measurements of received signal strength, made by the user equipment on reference signals received by the user equipment from the base station and the relay node, respectively, whether the user equipment has an increased risk of being interfered by transmissions made over the backhaul link; and
inform a scheduler that the scheduling of resources over the first radio link between the and the user equipment is not to be shared with the resources scheduled over the backhaul link.

16. The arrangement according to claim 15, wherein the processing circuit is further configured to determine to hand over the user equipment to the relay node when the resulting data-rate performance over the backhaul link and data-rate performance over the second radio link between the relay node and the user equipment is greater than the data-rate performance over the first radio link between the base station and the user equipment.

17. The arrangement according to claim 16, wherein the processing circuit is also configured to obtain an estimation of a Signal-to-Noise Ratio for the backhaul link, and to compare the obtained Signal-to-Noise Ratio for the backhaul link with a first backhaul threshold value.

18. The arrangement according to claim 15, further comprising:
a receiver configured to receive a measurement of received signal strength from the user equipment, measured over the first radio link, and to receive a measurement of received signal strength from the user equipment, measured over the second radio link;
wherein the processing circuit is further configured to schedule the user equipment so as to avoid interference from the relay node when the received signal strength measured over the second radio link plus a parameter δ is greater than the received signal strength measured over the first radio link.

19. The arrangement according to claim 15, further comprising a transmitter configured to transmit an instruction to be received by the user equipment instructing the user equipment to not report any signal strength measurements, when the signal strength measurements are smaller than a threshold value.

20. The arrangement according to claim 15, further comprising a receiver configured to receive a report of received signal strength from the user equipment; and wherein the processing circuit is further configured to estimate the data-rate performance over the first radio link based on the report of received signal strength received from the user equipment.

21. The arrangement according to claim 15, wherein the processing circuit is also configured to:
   collect information about the relay node, the information identifying the second network node as a relay node; and
   determine compatibility of the identified relay node with the first network node.

* * * * *